United States Patent
Dimou et al.

(10) Patent No.: US 8,588,057 B2
(45) Date of Patent: Nov. 19, 2013

(54) METHOD AND APPARATUS FOR RADIO LINK FAILURE RECOVERY IN A TELECOMMUNICATION SYSTEM

(75) Inventors: Konstantinos Dimou, Stockholm (SE); Muhammad Kazmi, Bromma (SE); Magnus Lindstrom, Spanga (SE); Gunnar Mildh, Sollentuna (SE); Mats Sagfors, Kyrkslatt (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 452 days.

(21) Appl. No.: 12/863,203

(22) PCT Filed: Jan. 16, 2009

(86) PCT No.: PCT/SE2009/050042
§ 371 (c)(1),
(2), (4) Date: Jul. 16, 2010

(87) PCT Pub. No.: WO2009/096883
PCT Pub. Date: Aug. 6, 2009

(65) Prior Publication Data
US 2011/0080825 A1     Apr. 7, 2011

Related U.S. Application Data

(60) Provisional application No. 61/021,981, filed on Jan. 18, 2008.

(51) Int. Cl.
*G01R 31/08* (2006.01)
(52) U.S. Cl.
USPC .......................................... 370/216; 370/242
(58) Field of Classification Search
USPC ........................................ 370/216, 242–245
See application file for complete search history.

(56) References Cited

U.S. PATENT DOCUMENTS

2002/0049058 A1* 4/2002 Tee ............................... 455/437
2004/0203539 A1   10/2004 Benes et al.
(Continued)

FOREIGN PATENT DOCUMENTS

| CN | 1486105 A | 3/2004 |
| CN | 101171854 A | 4/2008 |
| WO | 2006122233 A2 | 11/2006 |

OTHER PUBLICATIONS

3rd Generation Partnership Project. "Radio Link Failure Recovery." 3GPP TSG-RAN WG2 Meeting #58, R2-072382, Orlando, US, Jun. 25-29, 2007.

(Continued)

*Primary Examiner* — Afshawn Towfighi
(74) *Attorney, Agent, or Firm* — Coats and Bennett PLLC

(57) ABSTRACT

The teachings presented herein enable a user terminal to perform a fast recovery from a radio link failure. In one aspect, the improvement in recovery time is achieved by commanding or otherwise causing the user terminal to perform radio link failure (RLF) recovery at a cell that is known to possess the user context, while considering that this cell should yield good radio conditions (if not the best) to the user terminal. A cell may be predefined for use by the user terminal in recovering its radio connection. Based on providing signal strength thresholds to the user terminal, for use in determining whether to use a predefined cell for reconnecting to the network, the user terminal attempts RLF recovery first in the predefined cell. By providing user context to the predefined cell in advance of a recovery attempt by the user terminal, the time for recovery is lessened. Note that the user terminal also may infer which cells are preferred.

17 Claims, 8 Drawing Sheets

(56) References Cited

U.S. PATENT DOCUMENTS

2006/0159038 A1* 7/2006 Hasty et al. .................. 370/315
2006/0258350 A1 11/2006 Roy et al.
2007/0230399 A1 10/2007 Oswal et al.

OTHER PUBLICATIONS

3rd Generation Partnershp Project. "Resource Handling During Radio Link Failure." 3GPP TSG-RAN#59 WG 2 LTE, R2-073142, Athens, Aug. 20-24, 2007.
3rd Generation Partnership Project. "Radio Link Failure Recovery Clarifications." 3GPP TSG RAN WG2#50, R2-074185, Athens, Greece, Aug. 20-24, 2007.
3rd Generation Partnership Project. ETSI TS 136 300 V8.3.0 (Jan. 2008). Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.3.0 Release 8).
CN Office Action dated Aug. 30, 2012 in re Chinese Application No. 200980102878.3 filed on Jan. 16, 2009.
Ericsson, "Analysis of Speed Dependent Cell Reselection Requirements," 3GPP TSG-RAN WG4 (Radio) Meeting #44bis, Oct. 8-12, 2007, Shanghai, China.
3rd Generation Partnership Project, "Technical Specification Group Radio Access Network; Evolved Universal Terrestrial Radio Access (E-UTRA) Radio Resource Control (RRC); Protocol specification," Dec. 2007, 3GPP TS 36.331 V8.0.0 (Release 8).
3rd Generation Partnership Project, "Technical Specification Group Radio Access Network; Evolved Universal Terrestrial Radio Access (E-UTRA) and Evolved Universal Radio Access Network (E-UTRAN); Overall description; Stage 2," Sep. 2007, 3GPP TS 36.300 V8.2.0 (Release 8).
NTT Docomo, et al., "Speed dependent scaling of mobility control parameters," 3GPP TSG RAN WG2 #60, Nov. 5-9, 2007, Jeju, Korea.
Nokia Siemens Networks, et al., "Speed Dependent Reselection for E-UTRAN," 3GPP TSG-RAN WG2 Meeting #59bis, Oct. 8-12, 2007, Shanghai, China.
NTT Docomo, et al., "Speed dependent scaling of cell reselection parameters," 3GPP TSG RAN WG4 #44, Aug. 20-24, 2007, Athens, Greece.
LG Electronics Inc., "The timing for cell reselection," 3GPP TSG-RAN WG2 #59bis, Oct. 8-12, 2007, Shanghai, China.
Vodafone Group, "Some considerations for cell re-selection requirements relating to high and low speed mobility in E-UTRA," 3GPP TSG-RAN WG4 Meeting #44, Aug. 20-24, 2007, Athens, Greece.
Qualcomm Europe, "Handover failure procedure," 3GPP TSG RAN WG 2 LTE RRC ad-hoc, Dec. 13-14, 2007, Vienna, Austria.
NTT Docomo, et al., "Field trial results on Speed dependent scaling of mobility control parameters," 3GPP TSG RAN WG4 #45, Nov. 5-9, 2007, Jeju, Korea.
Qualcomm Europe, "Handover signalling in E-UTRAN," 3GPP TSG-RAN WG 2 meeting #59, Aug. 20-24, 2007, Athens, Greece.
NTT Docomo, et al., "Speed dependent scaling of cell reselection parameters," 3GPP TSG RAN WG2 #59bis, Oct. 8-13, 2007, Shanghai, China.

\* cited by examiner

METHOD AND APPARATUS FOR RADIO LINK FAILURE RECOVERY IN A TELECOMMUNICATION SYSTEM

TECHNICAL FIELD

The present invention relates to radio link failure recovery in a telecommunication system, such as a wireless communication network, and particularly relates to reducing failure recovery times.

BACKGROUND

A common task in radio communication systems is handling the behavior of a user terminal upon detection of a radio link failure (RLF). In a known approach to recovering from a radio link failure, the user terminal makes a random access to the cell where it is located. Thereafter, and upon allocation of resources from the network, the mobile terminal sends a message informing the network that it has experienced a radio link failure and is trying to re-establish its connection. In the latest version of the controlling specifications for Long-Term Evolution (LTE) systems, as standardized by the 3GPP, the reconnection message is called a "Radio Resource Control (RRC) Connection Re-Establishment Request." Particularly, in 3GPP LTE, three RRC messages are exchanged during RLF recovery: (i) RRC Connection Re-establishment request from the user terminal (referred to as a UE in LTE) to a base station (referred to as an eNB in LTE); (ii) RRC Connection Re-establishment from the eNB to the UE; and (iii) RRC Connection Re-establishment complete from the UE to the eNB.

More generally, in case of a radio link failure, a given user terminal may synchronize with the cell where it is located, listen to the broadcast channel of that cell, and subsequently make a random access attempt therein. Upon a successful random access attempt, the user terminal is assigned the necessary resources to transmit its request for radio bearer re-establishment. A primary aim is that the user terminal performs the RLF recovery procedure with a minimum time delay such that the connection is maintained. Recovery delays are reduced when the random access attempt and the associated Layer-3 (L3) message transmissions are done in favorable radio propagation conditions. The time needed for recovery also depends on whether or not the cell to which the user terminal attempts recovery already possesses the user context for the user terminal.

That is, user context information is needed to recover the user terminal's radio link, so not having user context at the cell where recovery is being attempted causes delays while user context information is transferred or otherwise provided to the cell. Commonly, if it is not already present in the cell being used for recovery, user context information must be fetched from the user terminal's last serving cell. The time needed for fetching may be considerable as, for example, the information comprising the user context can include physical layer identity, Medium Access Control (MAC) identity, temporary terminal identity, transport channel and logical channel parameters, Radio Link Control (RLC) buffer status, RLC timers and parameters, ciphering parameters, etc.

User context is maintained in a user terminal's serving cell, e.g., at a base station controlling the serving cell. Thus, if the user terminal remains within the coverage area of its last serving cell after experiencing a radio link failure, its user context information will already be available at the serving cell base station, for use in quickly recovering a radio link to the user terminal. However, according to existing approaches to recovery, user terminals attempt recovery in given cells without benefit of knowing whether such cells have their user contexts available for quick recoveries of their radio connections.

More precisely, according to TS 36.331, the user terminal upon detection of radio link failure tries to synchronize to the system (in case it has lost its synchronization) and then starts measuring on the pilot channels, so as to detect the cell yielding the strongest signal. Once this is done, the user terminal listens to the broadcast channel of the selected cell and then attempts a random access in this designated cell. Hence, the user terminal performs radio link failure recovery to the cell which is yielding the strongest pilot signal, without any knowledge of whether this cell has the UE context.

For example, a common scenario for radio link failures is the user terminal performing a handover from a source (serving) cell to a handover target cell. When handover is triggered for a given user terminal, it is very likely that the serving cell radio link for that user terminal is experiencing considerable loss rates. Thus, even if the serving cell can be detected by the user terminal after a handover-related RLF and random access attempts can be performed to that cell, it is likely that the radio conditions with respect to the serving cell are not good enough to support reliable reconnection. Therefore, the user terminal likely will look for another cell in which to reconnect, without benefit of knowing whether that other cell has its user context. Indeed, it may be that the user terminal cannot even detect its last serving cell after experiencing a handover-related RLF.

Another known recovery approach, therefore, is the user terminal attempts a radio access to the cell that offers the best radio link to the user terminal, according to the last measurements done. However, this option is optimal only in cases where the user terminal is aware of the cell which offers the best link, at the moment the user terminal initiates the radio link failure recovery procedure. This option exists, e.g., in case of handover failures where the last measurement that has been done by the user terminal indicates that the best cell is the (handover) target cell. If the user terminal has indeed moved to the target cell, the target cell is the cell exhibiting the best radio propagation conditions. However, there might be other cases where this assumption does not hold, e.g. in case the radio link failure occurred during handover procedure and a user terminal, which moves with high speed, initiates the radio link failure recovery procedure when the user terminal is not anymore in the target cell. As mentioned above, this last cell (target cell) was supposed to be the cell offering the best signal quality to the user terminal, according to the latest measurement done by the user terminal. Even in this case it might be possible for the user terminal to perform measurements so as to detect the best cell and then try to perform random access and, consequently, the radio link failure recovery procedure. However, this procedure (i.e. the user terminal measures thoroughly so as to estimate the best cell, or decodes the synchronization sequence or pilot channel of this cell so as to get information on its characteristics, i.e. timings of the random access channel, in case the terminal has lost its synchronization) requires time; this time might be shortened in certain cases. The user terminal may also read the broadcast channel of this cell to acquire the system information.

Considering also that it is beneficial purely from the connection continuation point of view to try to connect to the serving cell, where the user terminal context is certainly available, in previous to 3GPP LTE systems and, initially, within 3GPP LTE, it was suggested that upon detection of a "radio problem," the user terminal tries during a time period $T_1$ to re-establish an RRC connection to the serving cell. However, this approach to reconnecting is not always necessary, such as where it is improbable that the user terminal has remained in the previous serving cell where it lost connectivity.

For illustrative purposes and for the sake of exemplifying the above described problems, a more detailed description of the RLF recovery procedure in 3GPP LTE follows. In 3GPP LTE, as in current and previous radio communication systems, when a radio link failure (or "radio problem") is detected by a user terminal, a procedure to re-establish its radio link connection with the network is performed. After the radio problem detection, the user terminal might be able to maintain its synchronization with its last serving cell, or not. In case the user terminal loses its synchronization with its serving cell, the first step in the RLF recovery procedure is the user terminal trying to synchronize with a cell of the network.

Usually, this cell is the cell that the user terminal receives with the strongest received signal strength over the pilot channel. In some cases, this cell might be the one that the user terminal detects first, without this cell being necessarily the strongest one. Upon synchronization to the selected cell, the user terminal listens to the cell's broadcast channel. After having acquired the necessary information from the cell's broadcast channel, the user terminal attempts a random access in the cell.

Upon a successful random access attempt, the user terminal transmits a Layer-3 signaling message, indicating that the user terminal is trying to recover from a radio link failure. In 3GPP LTE, this message is termed an RRC Connection Reestablishment request. The cell ID of the last cell to which the user terminal maintained an active connection might be included as part of the request message. If the cell selected for reconnection by the user terminal already possesses the user terminal context, the RRC connection reestablishment starts. FIG. 1 illustrates the steps involved in a conventional approach to RLF recovery, where the user terminal has lost its synchronization to its serving cell (in 3GPP LTE this procedure starts upon expiry of a timer T310).

According to the illustrated process, the user terminal detects radio link failure (Block 100), and selects a cell (e.g., based on signal strengths) for attempting to recover its radio link (Block 102). The procedure continues with the user terminal listening to a broadcast channel of the selected cell to obtain information for making a random access on a reverse-link random access channel (RACH) (Block 104), and then performing a random access (Block 106). Upon gaining a corresponding resource allocation (Block 108), the user terminal uses the allocated resources to send an RRC connection reestablishment request message (Block 110), and then carries out RRC connection reestablishment (Block 112) to completion (Block 114).

In case of an RLF recovery attempt within a cell which does not possess the user context for the user terminal, the cell has to request the user context from the last serving cell of the user terminal, assuming that communication between these two cells is possible. If the transfer of user context fails or is not possible, the network directs the user terminal to idle mode and a new RRC connection may be established. Signaling information consisting of the user context is then exchanged between the user terminal and the new serving cell. The amount of information required for the establishment of an RRC connection is not insignificant; hence, the time required for this procedure is considerable.

The above mentioned procedure might result in the user terminal performing random access to the cell that yields the strongest signal to the terminal. However, in scenarios, where the user terminal is located in an area overlapped by multiple cells and is moving fast, it may detect strong signals from more than one cell. In such scenarios, a more elaborate method would be that the user terminal synchronizes to the system and then measures the signal strengths received from the various cells so as to select the cell yielding the strongest signal strength. FIG. 2 represents this more elaborated procedure, where processing begins with the user terminal detecting radio link failure (Block 120), synchronizing with the system (network) (Block 122), and measuring the received signal strength from the cells within its location area (Block 124). Upon detecting and selecting the strongest cell in the location area (Block 126), the UE listens to the broadcast channel (Block 128) of the selected cell. Subsequently, the user terminal performs random access in the strongest cell (Block 130) to request signaling resources. Upon gaining such resources (Block 132), the user terminal sends an RRC connection reestablishment request message (as a Layer 3 message) (Block 134), and carries out reconnection procedures (Block 136) to completion (Block 138).

In the above described procedure, the user terminal ensures that the cell it selects for attempting recovery offers good radio conditions; indeed, it selects the best cell in terms of signal strengths from among the cells it detected. However, it may be that the selected cell does not have the user context for the user terminal. Recovery will be delayed in such cases.

SUMMARY

The teachings presented herein enable a user terminal to perform a fast recovery from a radio link failure. In one aspect, the improvement in recovery time is achieved by commanding or otherwise causing the user terminal to perform radio link failure (RLF) recovery at a cell that is known to possess the user context, while considering that this cell should yield fairly good radio conditions (if not the best) to the user terminal. Thus, a cell may be predefined for use by the user terminal in recovering its radio connection, such that the user terminal identifies the predetermined cell to use in recovering its radio link. Based on providing signal strength thresholds to the user terminal for use in determining whether to reconnect through the predefined cell, the user terminal attempts recovery of its radio link first in the predefined cell. By providing the user context for the user terminal to the predefined cell in advance of a recovery attempt, the time for recovery is lessened. Note, too, that the user terminal may be configured to infer which cell or cells are predefined as targets for RLF recovery.

In one or more embodiments, the predefined cell to be preferred by the user terminal for radio link recovery is determined by the user terminal's currently serving base station. In at least one such embodiment, the identification of the predefined cell(s) by the serving base station is based on information regarding the movement of the user terminal (e.g. user terminal speed, direction of movement, position) and on user mobility history, or mobility associated measurements done within the serving cell, etc. The predefined cell(s) identified by this evaluation receive the user context for the user terminal, e.g., the base station controlling the user terminal's current serving cell sends the user context to the base station(s) controlling the predefined cell(s). Correspondingly, the serving base station notifies the user terminal via signaling, e.g., it may explicitly signal cell IDs for the predefined cell(s) to the user terminal, identifying them as being predefined for radio link recovery. Optionally, the serving base station might request an acknowledgement of this notification. In any case, if the user terminal experiences radio link failure, the user terminal initiates the RLF recovery procedure with the designated cell. In at least one embodiment, the user terminal preferentially uses the designated cell for recovering its radio link, if the designated cell is among the K best cells that the user terminal detects, or measures, immediately after the detection of radio link failure or "radio problem." Additionally or alternatively, the designated cell is preferentially used by the user terminal if its signal strength is within a range of G dBs from that of the best cell (among the cells that are detected as candidates for use in recovering the user terminal's radio link).

It is also suggested that, in certain cases such as when the user terminal moves at considerably high speed, the user terminal does not try to "go back" to its last serving cell for RLF recovery, if it is known that the probability of the user terminal returning to or remaining in its serving cell is very low. In case the system supports the method of the user terminal trying to connect first to the immediately prior serving cell for a given time, the time during which the user terminal tries to re-establish its connection with the serving cell is defined by a timer, It is suggested herein to modify the value of this timer on the basis of the user terminal speed, i.e., the faster the user terminal moves the shorter the timer value.

In addition, the RRC connection reestablishment is also shorter in duration, due to the fact that the predefined cell is in possession of the user context and, consequently, the amount of signaling required for the reestablishment is considerably reduced. Consequently, the radio link failure recovery becomes faster. This predefined cell is determined on the basis of user terminal speed, direction, position update and previous user terminal movement history and mobility related measurements within the serving cell, e.g. most of the handovers from users within this serving cell are done towards a specific cell.

DETAILED DESCRIPTION

One embodiment of an RLF recovery mechanism contemplated herein focuses on cases where handover fails. Handover is an important mechanism for maintaining the continuity of a user connection. In LTE, a robust and fast handover is a challenging task. One reason is that in LTE systems, handover between two eNBs implies complete cut-off of a user terminal's connection to its serving cell, before the user terminal attempts to access the neighbor cell. In other words, hard handover is used in 3GPP LTE, in contrast with the first releases of 3GPP UMTS, where soft-handover is implemented. Another reason is the distributed architecture of LTE systems, which requires coordination between neighbor eNBs.

In case of an unsuccessful handover, a mechanism is defined where the user terminal can recover the ongoing connection in a new cell, based on the terminal transmitting a message to a new cell in the area where it is located and thus notifying the network about its radio link failure (RLF). The cell to which the user terminal is attempting RLF recovery tries to restore the necessary user context and admit the user terminal to the network. This can be done in case the new cell is aware of the user context. A primary goal for the RLF recovery procedure is that it is done with the minimum possible delay. The method is described in the context of the 3GPP LTE system. Hence, the terminology and the network scenario presented below refer to such systems. However, the idea can be applicable to any kind of wireless communication system that employs similar radio link failure recovery mechanisms and that features similar network architecture.

According to an embodiment of the present invention, a user terminal performs random access to a cell that possesses its user context, if such access is possible. A cell is predefined, for example, on the basis of user speed, direction, location update and/or on the basis of history of user's movement and on previous mobility related measurements within the cell. It is assumed that the user context has been transferred from the last serving cell of the user terminal to the predefined cell, and that the user terminal has been notified in some way that its context has been transferred to specific cells. The notification can be done by explicit signaling, for example, or such information can be appended to a handover command message sent to the user terminal. Upon reception and acknowledgement of such a message, the user terminal, in case of RLF recovery, tries to initiate RLF recovery in a predefined cell (i.e., in one of the cells indicated as having the user context for the terminal). Initiating recovery in a predefined cell can be conditioned on the requirement that the cell selected for attempting recovery be among the K strongest cells, and within a range of G dBs from the strongest cell.

Figure 1:
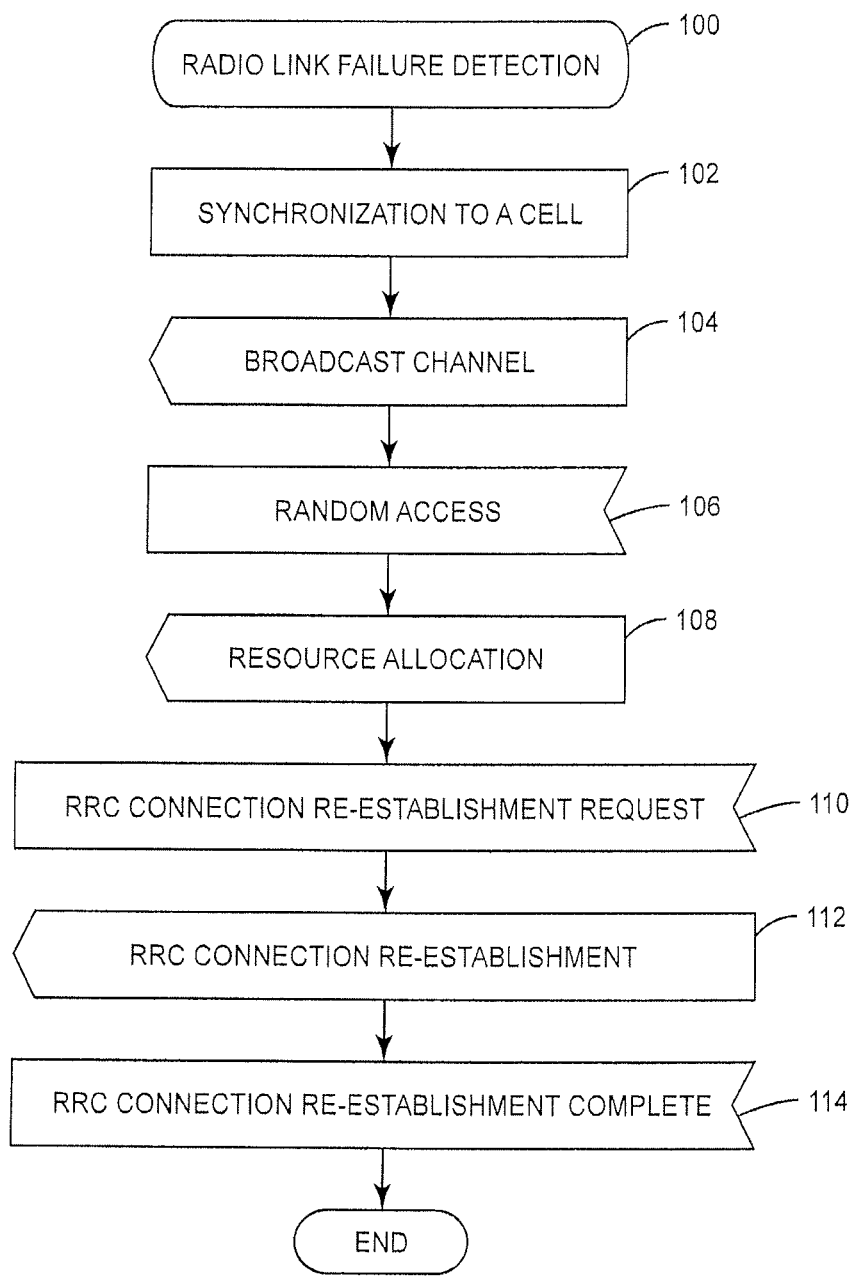
FIG. 1 illustrates a conventional radio link failure recovery procedure.
Figure 2:
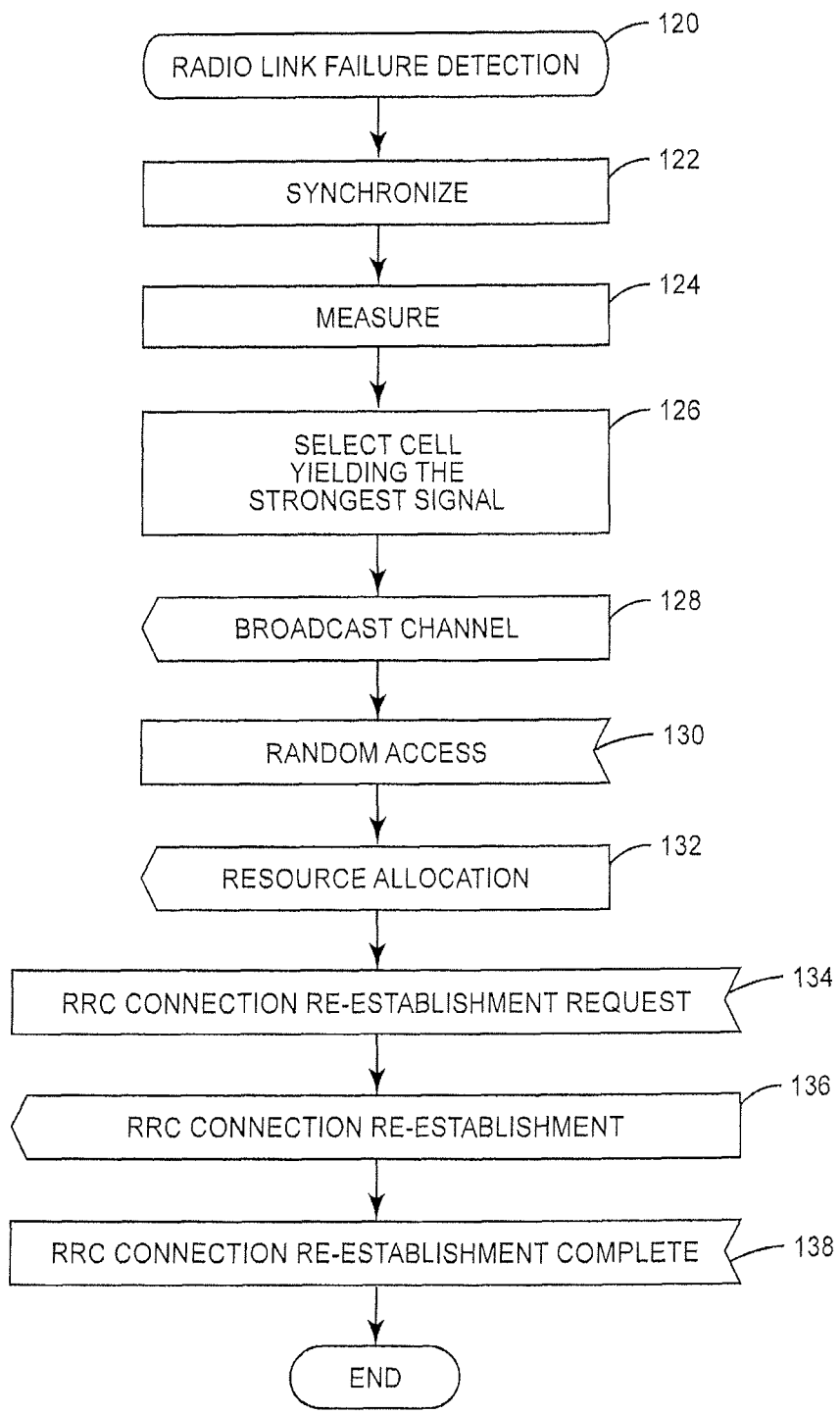
FIG. 2 illustrates another conventional radio link failure procedure.
Figure 3:
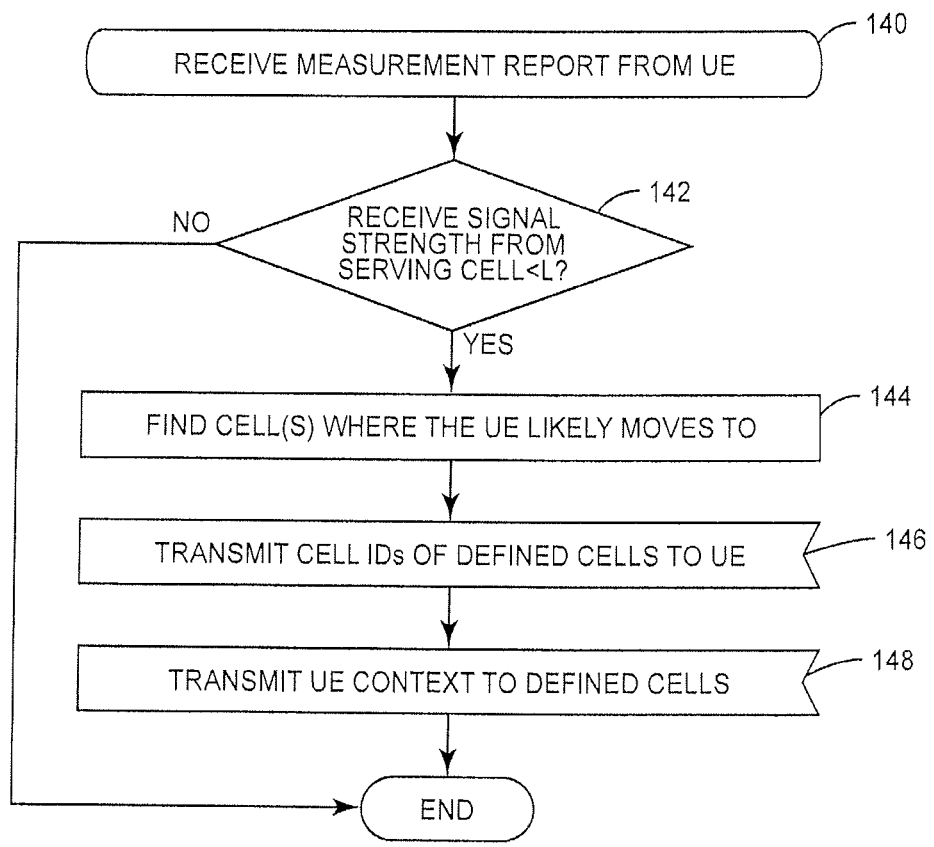
FIG. 3 illustrates one embodiment of the RLF recovery procedure, as may be implemented at a serving base station.

In another embodiment, user context can be transferred from the user terminal's current serving base station to likely handover target cells, in response to detecting that the received signal strength of the serving cell at the user terminal has fallen below a pre-defined threshold, L. The method can be initiated by the user terminal or by the base station, such as upon reception of a measurement report from the user terminal. FIG. 3 illustrates the latter case, where a base station proactively sends the user context for a given user terminal to one or more other base stations that control cells known or predicted to be the most likely handover targets for the user terminal. The illustrated processing begins with the (serving) base station receiving a signal strength measurement report from the user terminal (Block 140), and determining whether the serving cell's signal strength as received by the user terminal is below the predefined threshold L (Block 142). If so, the serving base station determines where the user terminal is most likely to move to (Block 144), and it sends to the user terminal the IDs of those cells (Block 146), and sends the user context of the user terminal to those cells (Block 148).

Within 3GPP, it is suggested that the user context in case of handover of a specific user terminal is transferred to a target cell. Hence, in case radio link failure occurs during a handover procedure, and the user terminal moves with a low to medium speed towards the target cell, then the user terminal initiates the radio link failure recovery procedure at the target cell. Hence, it does not attempt at all to go back to its last serving cell, i.e. timer T is set to 0. A prerequisite so as to perform radio link failure recovery within this target cell is that the target cell is among the strongest R (or K) cells that the user terminal has detected during cell search and synchronization procedure (or alternatively that the target cell is within a range M of the strongest cell. For example, the target cell may be selected by the user terminal for use in recovering its radio link if, as among the cells that the user terminal has detected as candidates for attempting recovery, the target cell's signal strength is within a range of G dBs of the strongest cell signal strength.

Figure 4:
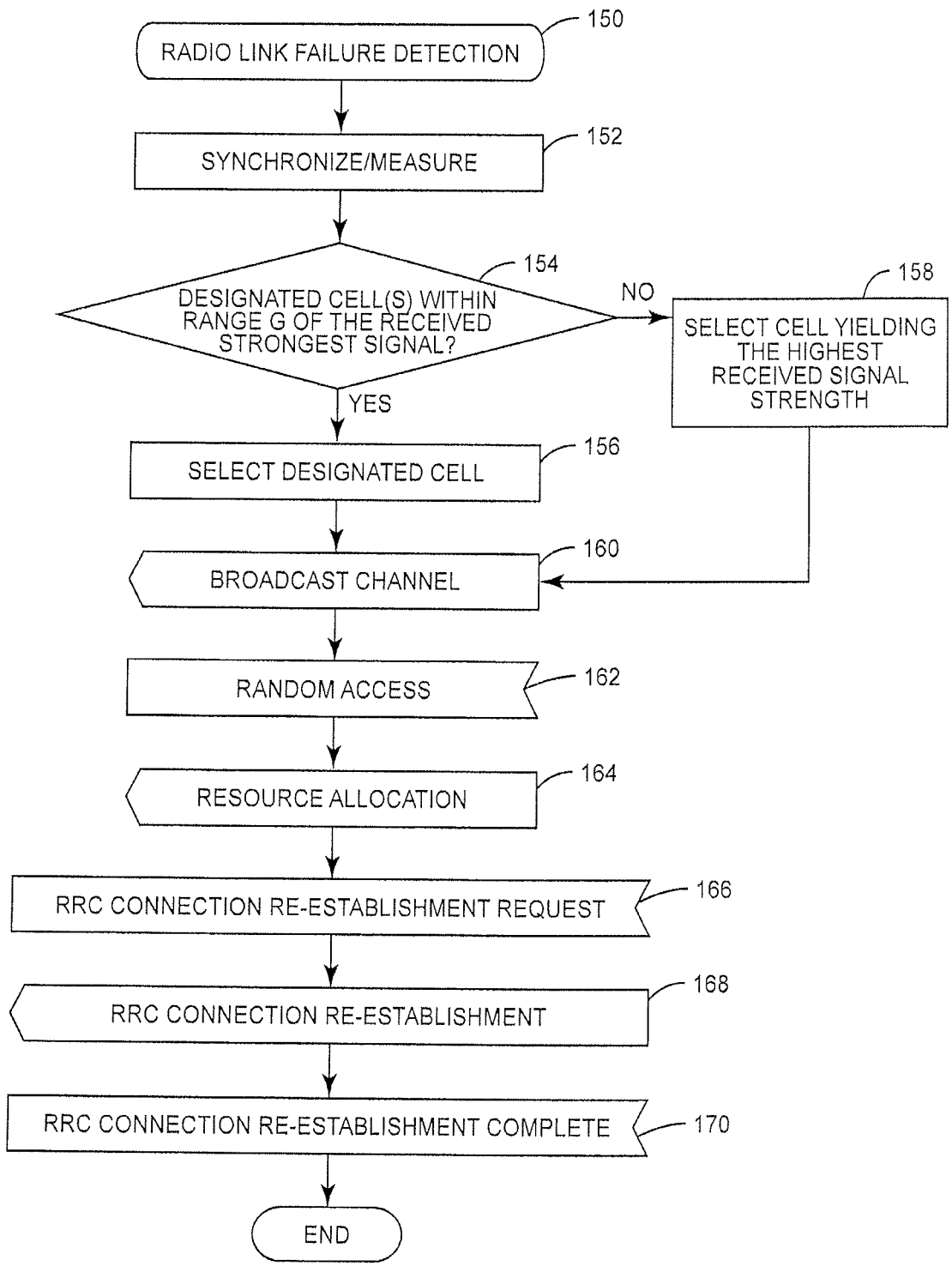
FIG. 4 illustrates one embodiment of the RLF recovery procedure taught herein, as may be implemented at a user terminal.

FIG. 4 illustrates an embodiment of the above described method. Processing begins with detection of radio link failure (Block 150). The user terminal detects a number of cells as available use by the user terminal for RLF recovery and measures received signal strengths at the user terminal for them (Bock 152). The user terminal evaluates whether the received signal strength for a predefined cell among the detected cells is within G dBs from the strongest cell (Block 154). If so, the user terminal selects the predefined cell for first attempting recovery (Block 156). If not, the user terminal selects the best cell (the cell associated with the strongest received signal at the user terminal) for first attempting recovery (Block 158). In either case, processing continues with the user terminal synchronizing with the selected cell and receiving its broadcast channel (Block 160), making a random access in the selected cell (Block 162), obtaining a resource allocation (Block 164) and sending a reconnection request (Block 166) using the allocated resources. Processing continues with performing reconnection (Block 168) to completion (Block 170), at which point the user terminal is reconnected to the network via the selected cell.

Figure 5:
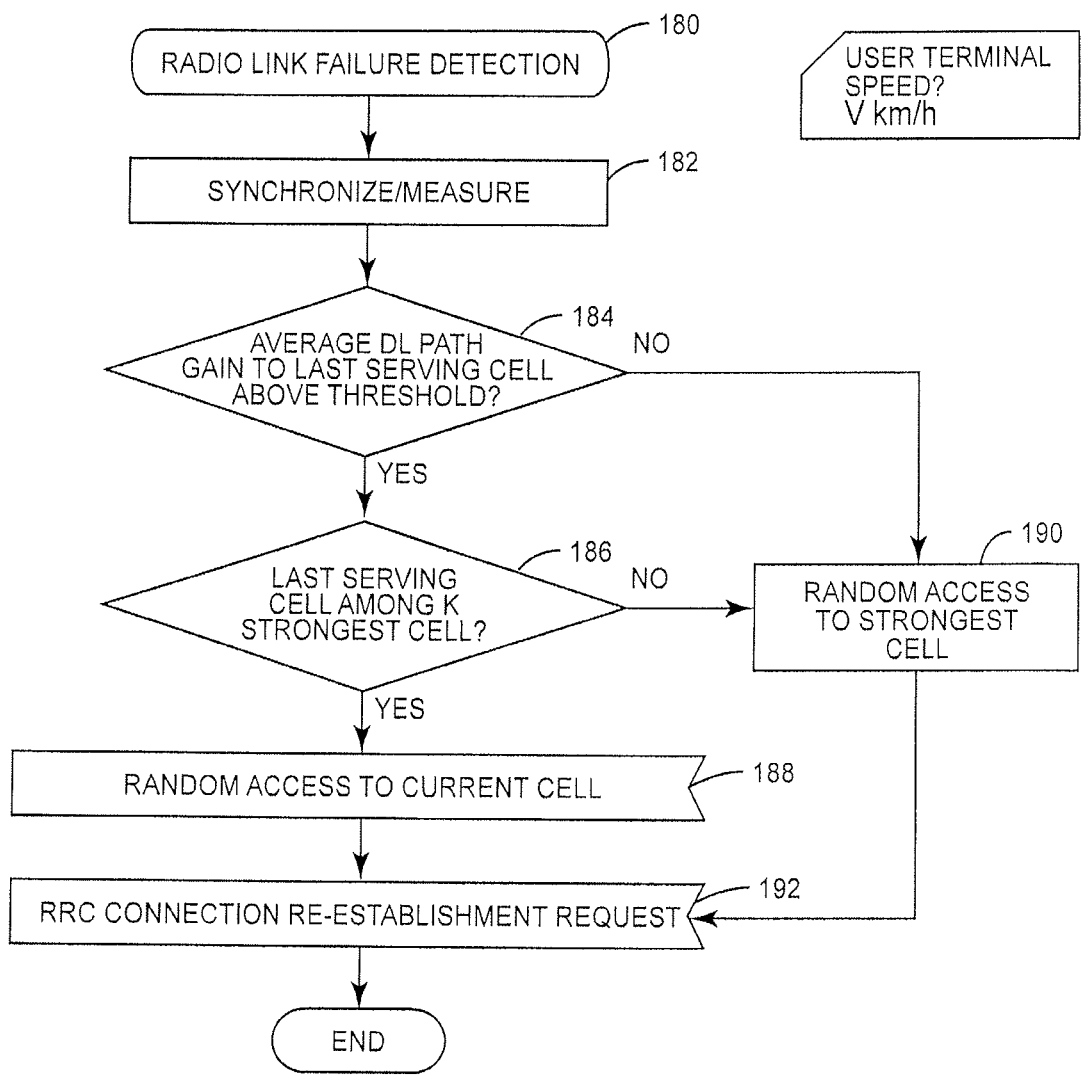
FIG. 5 illustrates one embodiment of the RLF recovery procedure taught herein, as may be done when the user terminal is not in a handover procedure and does not move with low or medium speed.

FIG. 5 illustrates another embodiment that may be advantageous in case the user terminal moves with a low to medium speed and it is located in an area with regular propagation conditions, e.g., no tunnels, or metropolitan canyons exist. The illustrated processing begins with radio link failure detection (Block 180), but where no handover is triggered (Block 182). The user terminal checks whether the last measurement indicates that the average path gain to the current cell is above a threshold G (Block 184). If so, the user terminal checks whether the received signal strength at the user terminal for the current cell is among the K strongest ones of the cells detected by the user terminal (Block 186). If so, the user terminal attempts random access in the current cell (Block 188). If either the path gain check or the signal strength check fail, the user terminal attempts random access in the cell having the strongest received signal strength at the user terminal (Block 190), which may be understood as a "standard" or conventional approach to RLF recovery. In either case, processing continues with the user terminal sending a reconnection request in the selected cell (Block 192).

Another implementation that can reduce the time of RLF recovery is the reduction of the time before the instant when the procedure of FIG. 3 starts. During this time, the user terminal tries to find its last serving cell. In 3GPP LTE, upon detection of a "radio problem", the user terminal tries to re-establish its connection with its current serving cell. The time during which this is attempted, is controlled by a timer T. Upon expiry of this timer, the user terminal tries to re-establish its RRC connection with any of the cells it detects. This disclosure recognizes that in some scenarios it is estimated that the probabilities that the user terminal returns to its last serving cell (for reconnection) are very low. For example, when the terminal moves very fast or when it is moving away from the last serving base station. It is suggested then that the value of the timer T is defined on the basis of the user terminal speed; e.g. when a user terminal moves extremely fast, this timer can be set to 0. In case the user terminal moves very slowly, it might be beneficial if the user terminal tries for a longer period to go back to its serving cell; hence the value of the timer can be high enough.

As regards user terminal speed, and qualifying or categorizing user terminal speed, there are a number of existing techniques for detecting and measuring UE speed. The most classical ones rely on Doppler frequency estimation. Others rely on estimating pilot signal variations. Others rely on detecting pilot signal changes as measured pilot between two antennas, such as in the case of Multiple-Input-Multiple-Output (MIMO). One also may refer to Mostafa Z. Afgani, Harald Haas, Speed Estimation Using Relative Radio Frequency Signature Matching, VTC Fall 2007: 1970-1974. Still other techniques rely on counting the number of HOs, or cell reselections done within a given time period. Hence, detecting the speed of a user terminal is a known technique, and it is proposed herein to adapt certain aspects of radio link failure recovery as a function of user terminal speed, such as by adapting timers or thresholds used in making cell selections for reconnection as a function of the speed range of the user terminal. Finally, as further non-limiting references, one may refer to the 3GPP TS 36.104, and to 3GPP LTE 36.300, which discusses classifying user terminal speeds into a "normal" range or a "high" range, for purposes of cell reselection.

In addition, another part of the RLF recovery procedure introducing delay is the measuring of cell signal strengths. It is suggested to measure for shorter time duration if the cell to which the user terminal is asked to perform RLF recovery is within the best K cells (or is within range of G dBs from the strongest signal received from a cell). This procedure is inline with the concept of adapting mobility related parameters in function of user terminal speed. The value of the timer T for different user terminal speeds can be broadcasted in the cell, or it can be signaled explicitly to the user terminal.

Figure 6:
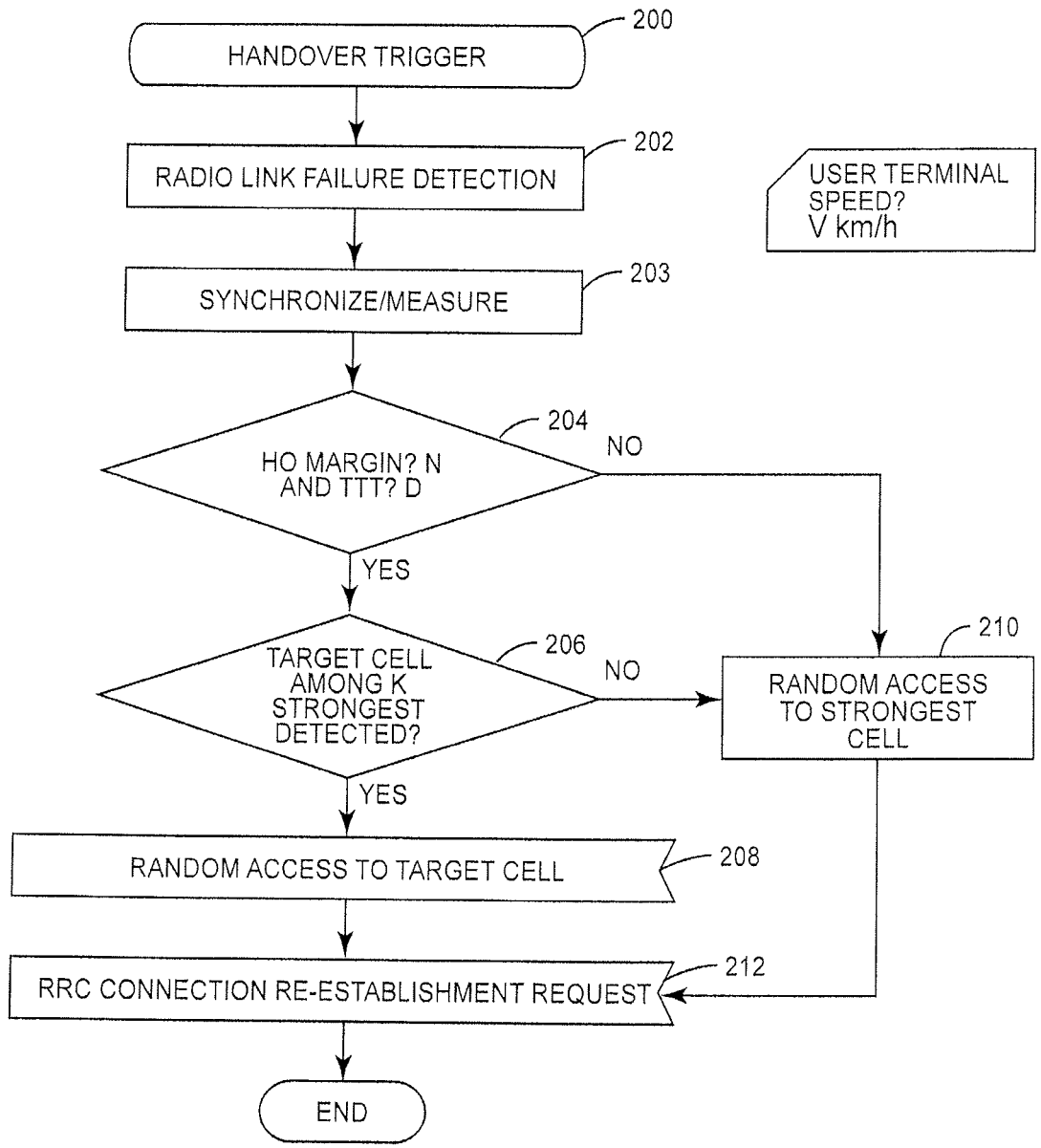
FIG. 6 illustrates one embodiment of the RLF recovery procedure taught herein, and particularly depicts an algorithm for the selection of the cell to which the user terminal should initiate the radio link failure recovery procedure when the user terminal is in handover and moves with low to medium speed.

In addition to performing a check that it is attempting reconnection through a cell that offers suitable radio conditions, the user terminal may perform other checks. In the context of a radio link failure subsequent to the triggering of handover to a target cell, for example, the user terminal may check whether a handover hysteresis value N and a time to trigger (TTT) value are above predefined thresholds. This check ensures that the target cell is providing clearly better radio conditions to the user terminal than the serving cell. If these two additional check conditions are not met, then the user terminal attempts RLF recovery in the last serving cell. FIG. 6 illustrates one embodiment of such processing.

The illustrated processing begins with handover being triggered (Block 200), and subsequent detection of a radio link failure (Block 202). Processing continues with the user terminal synchronizing to the network and measuring received signal strengths to detect cells (Block 203). The user terminal considers the handover target cell as a cell predefined for its use in attempting RLF recovery. Thus, if the handover target cell is among the detected cells, the user terminal checks whether the HO margin N is above a predefined threshold and whether the TTT value is above a predefined threshold for the predefined cell (Block 204). If so, the user terminal further checks to see whether the received signal strength for the target cell is among the K strongest detected cells (Block 206). If so, the user terminal performs random access in the target cell for failure recovery (Block 208). If not, the user terminal performs random access to its (last) serving cell (Block 210). In either case, assuming that random access was successful, the user terminal proceeds with sending a reconnection request message (Block 212).

Of course, one aspect of facilitating RLF recovery by the user terminal in a cell that already has the user context for the user terminal is a serving cell deciding to which neighbor cells it will transmit the user context for a given user terminal. The serving cell may make this decision on the basis of user terminal speed, direction of movement, position update, history of mobility, and history on mobility measurements done within the cell. According to one embodiment of the present invention, the above mentioned criteria are used in the following order:

1. User terminal speed and direction of movement.
2. User terminal position update.
3. History of user terminal movement.
4. Mobility related measurements within the (last) serving cell.

Alternatively, one or more of the above criteria can be used in any suitable order. Also, only sub-sets of the above measurements may be used depending, e.g., upon the network topologies, deployment scenario, base station and user terminal capabilities, etc. Also, in case the different steps lead to the identification of different cells, then weighting factors on each criterion can be applied. It is suggested to weigh criteria in accordance with the numbered list above.

Figure 7:
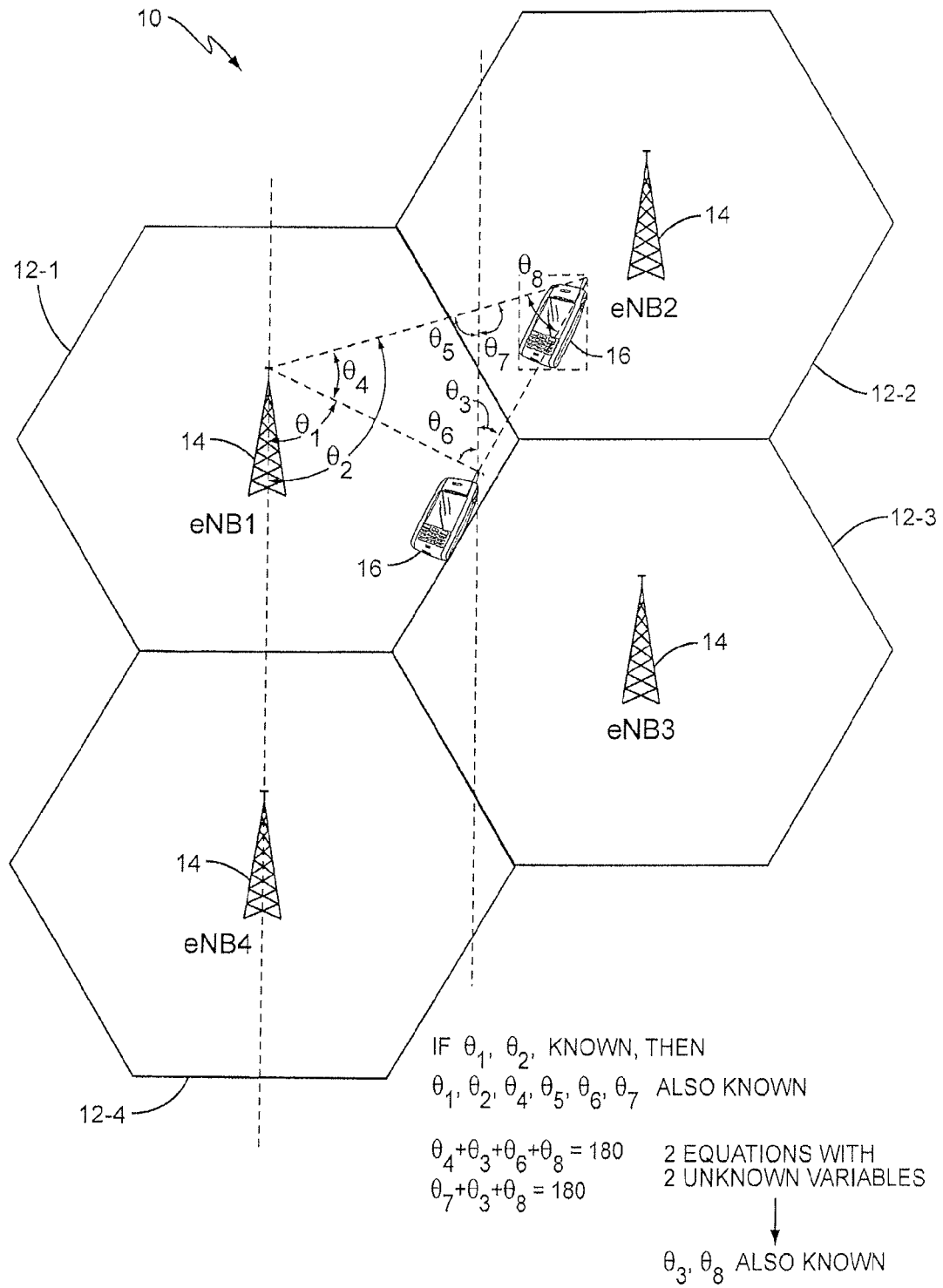
FIG. 7 illustrates one embodiment of the RLF recovery procedure taught herein, and particularly depicts estimation of the direction of a UE movement on the basis of signal angles of arrival.

All the above mentioned measurements are (or can be) available at the serving cell, i.e., the user terminal speed can be measured at the serving base station, e.g., at a serving eNB. Alternatively, the user terminal can estimate its speed and signal it to the base station. The estimation of the direction of movement of a user terminal, by using antenna arrays techniques is known. These techniques yield the signal angle of arrival and on the basis of this information, the angle of the user terminal to the eNB is estimated. FIG. 7 illustrates an example for estimating the direction of movement of a user terminal on the basis of angles of signal arrivals.

In more detail, FIG. 7 illustrates a wireless communication network 10, which includes a number of cells 12 (e.g., 12-1, . . . , 12-4). As a non-limiting example, each cell 12 includes a base station 14 (e.g., eNB1, . . . eNB4) providing radio coverage for the cell 12. One sees a user terminal 16 depicted as moving from cell 12-1, which operates under control of eNB1, to cell 12-2, which operates under control of eNB2. According to embodiments of the present invention, an operator can apply all of the above numerated criteria or a number of them (e.g. in case of uncertainty on the measured speed and the direction of user terminal movement). The positions update of the user terminal can be used by a suitable method (e.g. using GPS functionality) or by making use of user terminal or base station measurements related to positions. Alternatively, these sources of information can be combined such as to increase reliability of the estimated new cell. That is, in one or more embodiments, a base station or other network entity considers two or more these various sources of information in combination, to increase the accuracy at which the network 10 can predict the cell or cells that are the most likely destinations for the user terminal 16.

The information related to user terminal position and direction of movement can be particularly useful in some specific deployment scenarios: small cells (pico or micro-cells) adjacent to or embedded in a large cell, indoor or home base stations in the vicinity of an outdoor micro or macro cell etc. By knowing the user terminal position, speed, direction, etc., a serving cell can predict the potential cell(s) in which a given user terminal is likely to attempt re-establishment of its radio link if its ongoing connection fails. In turn, the serving cell can send the user context for the given user terminal to the cell or cells predicted as being the most likely ones in which the user terminal would attempt reconnection.

Another scenario in which user terminal position, movement, speed, direction, etc., can be of particular interest is when a new base station is being added and the user terminal is moving towards this new base station. In order to simplify network deployment in E-UTRAN, a new base station will be added by using an automatic neighbor relation function, which is a self organizing network capability. During the process of adding a new base station, the serving cell is not fully sure whether or not user terminals should perform handover to a new base station. Therefore, a given user terminal that is moving towards a base station lacking defined neighbor cell relations will not receive any handover command. Radio link failure is inevitable in such scenarios. However, the serving cell for such a user terminal can infer the most likely cell with which the user terminal will attempt to re-establish its radio link, based on user terminal position, speed, direction, etc., and on the deployment information. The serving cell can send the user context for user terminal to this other cell, based on its determination that it is most likely to be the one where the user terminal will attempt reconnection.

The same principle applies for the use of information on the history of user terminal movement. Consider a scenario where Items 1 and 2 (in the above enumerated listing) do not provide the desired reliability in the estimation of the cell to which the user terminal will move. In such cases, previous measurements of user terminal mobility can be used. For example, with reference to the user terminal at issue in FIG. 6, prior mobility measurements made for the user terminal may indicate that, for a given cell controlled by eNB1, N % of the handovers for the user terminal were targeted to a given cell controlled by eNB3, where N is a number between 0 and 100. With the benefit of such knowledge, and based on the value of N, eNB1 can predict that any handover from the current cell involving the user terminal is most likely to be targeted to the particular cell of eNB3 that is indicated in the prior mobility measurements, and it can therefore provide the user context for the user terminal to eNB3.

Hence, it is suggested that eNBs keep track of mobility measurements of the user terminals in their cells. The same applies for the criterion of mobility related measurements within a cell; e.g. 90% of the times user terminals in cell 1 perform handover or cell update, move to cell 2, etc. In addition, cells in the network preferably are aware of the topology of their neighbor cells, where such information can be retained at the base stations or associated controllers corresponding to the cells.

Upon successful recovery, the new serving eNB can ask the "prepared set" of cells from the previous serving eNB. Or alternatively, the original serving eNB transmits its "prepared set" to the eNBs to which it forwards the user terminal context. The new serving eNB can consider this previous prepared set and use it as a criterion for preparing its new one. The previous serving eNB can remove or store this set for future occasions. The user terminal "resets" the list of prepared set of cells. It waits then for the next signaling message from the new serving eNB, with the new "prepared set" list.

Considering that the suggested procedure increases signaling and runs as a back-up mechanism, for the case of RLF or handover failure, it might not need to be implemented for all of the cells in the system. A sensible option would be to implement the present invention in (network) areas with irregular propagation conditions or areas where the percentage of experienced RLF is considerably high.

In addition, within 3GPP LTE it is suggested to diffuse the user context for a given user terminal to a number of cells, when the user terminal is within a "handover region." User context for a given user terminal also may be diffused to neighbor cells when the user terminal is operating in an area with abnormal propagation conditions, e.g. an area with tunnels, or a metropolitan area with very tall buildings. In this case, the user terminal tries to find—for RLF recovery—one of these cells to which its context has been transferred. Hence, the suggested mechanism does not increase user terminal complexity significantly with respect to conventional standardized approaches for RLF recovery. That is, the present invention can be understood in one aspect as "guiding" the user terminal to a specific cell for RLF recovery, based on knowing or predicting that the cell has or is likely already to have the user context for the user terminal.

The above diffusion mechanism is most successful when the user context of the user is diffused to a number of neighboring cells. This implementation might be often used in areas with irregular propagation conditions. Hence, the network, being aware that the base stations belong to such an area, can request them to diffuse the user context of any given user terminal to a number of Q cells. These cells might be chosen on the basis of the history of a user's movement, or on the basis of a user's speed and direction of movement, or by using information on the user terminal's location, or on the basis of mobility related measurements done within the cell. It is necessary then to signal via the air interface the cell IDs of the cells, which possess the user context. User terminals having this information are enabled to search for these cells during the cell search and synchronization procedure that occurs during radio link failure recovery.

Moreover, in areas with irregular propagation conditions, it is suggested that the base stations might allocate dedicated RACH preambles in all of the cells to which the user context is transmitted. This might be negotiated with the cells, considering the eventual waste of RACH preambles and the increase in signaling via the X2 interface. This mechanism might be seen as a "back-up to handover mechanism," when a handover is unsuccessful and radio link failure is detected.

For the implementation of the above mentioned algorithms within a mobile communication system, such as 3GPP LTE, some amount of signaling is required. For example, for a given user terminal, the cell IDs to which the user context is transferred, the handover margin and TTT thresholds, the user terminal speed, direction of movement and location information, may be transmitted from a base station to the user terminal.

In case the user terminal receives a handover command to a cell, which is not the one that the terminal has reported as the best in terms of RSRP (Reference Signal Received Power) or RSRQ (Reference Signal Received Quality), then it stores the cell identity of the cells that are better than the cell to which the user terminal is handed over. In case of HO failure by the network target cell, the user terminal attempts random access and connection recovery to the cell which was reported in the last measurement report as the best in terms of RSRP and/or RSRQ.

The gain in terms of delay that can be obtained by the suggested mechanism are more evident, if the serving eNB has forwarded the user context of this user to this cell with the best RSRP (and/or RSRQ); even if this last one is not the target cell. In case this recovery failed in the best cell it would be possible to attempt recovery in the second best cell etc.

Additionally, it is suggested that in case the user terminal receives a handover command with the target cell being different than the one the user terminal has reported as the best (in terms of RSPR and/or RSRQ), it would be possible to use a shorter timer for detecting handover failure than when the user terminal receives a handover command with the target cell being the one with the best reported RSRP (and/or RSRQ). The motivation for this is that the recovery procedure can be faster in this case, which would make it possible to accept more handover failures.

Moreover, it is suggested that user terminal behavior in terms of measurements after the detection of handover failure is modified in the case where the user terminal has received a handover command with a target cell being different from the one with the best RSRP (and/or RSRQ); i.e. the user terminal might not perform new measurements upon detection of a handover failure.

The suggested method is expected to yield optimal results in terms of delay, when the user terminal moves with low to medium speeds.

In case an operator wants to have this option deactivated in certain areas of its network and for given time periods, then this can be broadcasted in the cell with an indication. Or, this can be explicitly signaled to the user terminal with the aid of the handover command.

In the latest version of 3GPP systems, which is called Long Term Evolution (LTE) of 3GPP, a robust and fast handover is a challenging task. One of the reasons is that in such systems, handover between two eNBs implies complete cut-off of the user's connection to its serving cell, before the user terminal attempts to access the neighbor cell (i.e. hard handover is used in 3GPP LTE in contrast with the first releases of 3GPP UMTS where soft-handover is implemented). Another reason is the distributed architecture of this system, which requires co-ordination between neighbor eNBs.

In case of unsuccessful handover, there will be defined a mechanism where the user terminal can recover the ongoing connection in a new cell. This can be done by the terminal transmitting a message to a new cell in the area where it is located and thus notifying the network about its radio link failure (RLF). The cell to which the user terminal is attempting RLF recovery tries to restore the necessary user context and admits the user terminal to the network. This can be done in case the new cell is aware of the terminal context. A primary goal for the RLF recovery procedure is that it is done with the minimum possible delay. The method is described in the context of the 3GPP LTE system. Hence, the terminology and the network scenario presented below refer to these types of systems. However, the idea can be applicable to any kind of wireless communication system that employs similar radio link failure recovery mechanisms and that features similar network architecture.

Typically handover decisions are made on the basis of received signal strength or of received quality (SINR). Hence, usually the cell yielding the strongest signal strength, or the best quality, is the one chosen by the serving eNB as the target cell. Nevertheless, for several reasons, the serving cell might decide to hand over the user terminal to a cell, which is not yielding the strongest signal strength. There might be several reasons for doing so, e.g., the cell makes use of previous mobility measurements for this user terminal, or it makes use of mobility measurements done within the whole cell. Or, the cell yielding the best measurement is not yet entirely configured in the system (it is still under its self configuration procedure), or the cell is overloaded or experiencing high interference. Such cases are anticipated to appear with more frequency in the future networks. Moreover, in certain cases, the cell predefined as preferred for use in RLF recovery might change during the day, or during a shorter time period, such as where a user is moving towards a crossroads that is located at the borders of the user's current serving cell, and the cell to which the user terminal is handed over depends on the road to which the user moves. An operator, based on the user's mobility history in this cell, may favor one of the cells. Moreover, the operator's preferred cell for designation as a predefined cell might change during the day.

Figure 8:
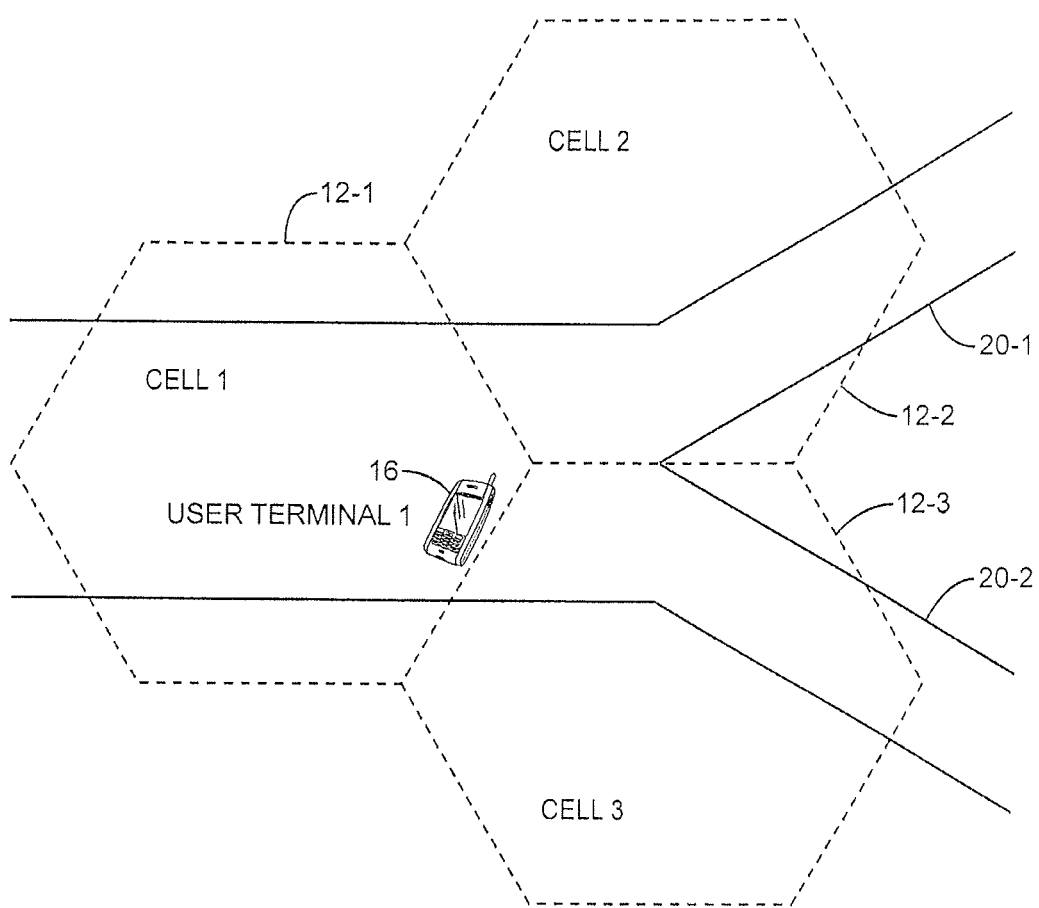
FIG. 8 illustrates a user terminal moving towards a crossroads.

FIG. 8 illustrates such a scenario: user terminal 1 moves towards a crossroads (splitting into roads 20-1 and 20-2), which is at the borders of the user terminal's current serving cell 12-1. The cell to which the user terminal is handed over depends on the road the user terminal takes at the crossroads. Based on the mobility history of that user terminal, the operator might favor cell 2 (covering road 20-1) over cell 3 (covering road 20-2), as a handover target, if previous statistics have shown that the user terminal has historically moved towards the road 20-1 within cell 2, for this specific time of the day. According to previous measurements of this user's mobility, the user terminal moves to the road 20-2 within cell 3 with higher probability during another time of the day. Hence, the operator might favor the handover to cell 3 over cell 2 at other time periods in the day.

There might be cases however, when the user terminal does not move to the cell predefined by the operator ("predefined" in this sense is the cell predicted by the network to be the cell the user terminal is most likely to move to). If the user terminal does not move into the predefined cell, the likelihood of handover failure increases. Moreover, in case this predefined cell is not the one yielding the strongest signal, the user terminal might experience a handover failure, by following the handover command of the network, whilst it has reported that the strongest signal is received from another cell.

Thus, in one embodiment, a user terminal is configured to implement a method to be executed upon reception of a handover command indicating a target cell, which is different than the cell that the terminal reported to have the strongest signal. In case of HO failure to the target cell, then the user terminal shall attempt connection recovery in the cell with the strongest signal that it has reported to the network. This procedure does not necessarily require additional signaling. As was illustrated in FIG. 3, a user terminal's serving base station can be configured to send the user context for the user terminal to one or more neighboring cells, based on evaluating cell signal strengths as reported by the user terminal. As an example, a base station can be configured to send the user context to the cell indicated as providing the strongest signal to the user terminal, regardless of whether that cell is a known or predicted handover target for the user terminal.

Correspondingly, in case the user terminal receives a handover command to a cell that is not the one that the terminal has reported as the best in terms of RSRP or RSRQ, the user terminal stores the cell identities of the cells that are better than the cell to which the user terminal is handed over. Then, in case of HO failure in the HO target cell as designated by the network, the user terminal is configured to attempt random access and connection recovery to the cell which was reported in its last measurement report as the best in terms of RSRP and/or RSRQ. The reduction of RLF recovery delays that are obtained by this approach depends on the serving base station forwarding the user context of the user terminal to the cell with the best RSRP (and or RSRQ), even if this best cell is not the HO target cell. More particularly, by transmitting the user context to some number of the best cells in terms of signal strength as indicated by the user terminal's last measurement report, the user terminal can attempt recovery in the best cell, and, in case recovery fails in the best cell, it would be possible to attempt recovery in the second best cell, etc.

Additionally, it is suggested that in case the user terminal receives a handover command with the target cell being different than the one the user terminal has reported as the best (in terms of RSRP and/or RSRQ), it would be possible to use a shorter timer for detecting handover failure, than when the user terminal receives a handover command with the target cell being the one with the best reported RSRP (and/or RSRQ). The motivation for this reduction in failure detection timing is that the recovery procedure itself is faster (by virtue of the cell being used for recovery already having the user context), meaning that more handover failures (as detected by the faster timer) are acceptable.

Moreover, it is suggested herein that the user terminal behavior be modified for instances where the user terminal has received a handover command with a target cell being different from the one with the best RSRP (and/or RSRQ). The behavior modification can be based on user terminal position, speed, direction, etc., and on the deployment information. As one such modification, the user terminal may be configured not to perform new measurements upon detection of a handover failure. The suggested method is expected to yield optimal results in terms of delay, when the user terminal moves with low to medium speeds. It is also proposed herein that, an operator can activate or deactivate any the radio link failure procedure modifications proposed herein on a selective basis, such as for specific cells or areas of the network, or for specific time periods (e.g., for certain times of day). any one or more of the improvements Such activations/deactivation can be broadcasted in cells, using a defined indication or, as another example, such information can be explicitly signaled to the user terminal with the aid of the handover command.

In any case, with the above embodiments and their variations in mind, it is proposed to implement in a user terminal a method of recovering from radio link failure, wherein the user terminal, after detecting a radio link failure, measures received signal strengths to detect cells available for use by the user terminal in reconnecting to the wireless communication network. The user terminal further determines whether any of the detected cells has been predefined for use by the user terminal for recovering from radio link failure. Here, a predefined cell is one known or predicted to have user context for the user terminal. The user terminal evaluates whether the predefined cell meets a signal strength threshold, and attempts radio link failure recovery first through the predefined cell if the predefined cell meets the signal strength threshold. Notably, the signal strength threshold to be used for determining whether to attempt reconnection through the predefined cell can be signaled to the user terminal.

Determining whether any of the detected cells is a predefined cell may be based on receiving signaling at the user terminal prior to the radio link failure that identifies one or more cells as predefined cells, e.g., receiving cell IDs for cells to which the user terminal's user context has been (or will be) transferred. Determining whether any of the detected cells is a predefined cell known or predicted to already have user context for the user terminal also may be based on considering a last serving cell and an identified or most likely handover target cell as predefined cells. In one such embodiment, the most likely handover target cell is determined from signaling from the wireless communication network or from a comparison of cell signal strengths as determined by the user terminal.

In the same or other embodiments, the user terminal considers the last serving cell as more predefined than the identified or most likely handover target cell if the user terminal speed is below a defined threshold. Otherwise, the user terminal considers the identified or most likely handover target cell as more preferred than the last serving cell.

In the same or other embodiments, the user terminal performs the steps of determining whether there are predefined cells among the cells detected by it as being available for use in attempting RLF recovery, and attempting reconnection first through a predefined cell, after expiration of a defined failure timer. The failure timer is triggered upon detecting a radio link failure. In such embodiments, the user terminal is configured to first attempt reconnection to a last serving cell of the user terminal, if radio link failure has been detected but where the failure timer has not expired. In at least one such embodiment, the method includes adjusting the defined failure timer as a function of user terminal speed, such that shorter expiration times are used for higher speeds and longer expiration times are used for lower speeds.

In the same or other embodiments, the method includes determining whether the signal strength of a predefined cell meets a signal strength threshold based on determining whether the predefined cell is among K detected cells having strongest signal strengths at the user terminal, where K is a defined number. Similarly, determining whether the predefined cell signal strength meets a defined signal strength threshold can be based on determining whether the signal strength of the predefined cell is within a defined threshold in dBs of a strongest signal strength at the user terminal among the detected cells.

Corresponding to the above user terminal methods and implementation, a (base station) method as taught herein supports recovery from radio link failure by a user terminal. In one or more embodiments, the method includes identifying a cell in a wireless communication network as a known or predicted handover target for the user terminal, and sending user context for the user terminal to the identified cell. The method further includes signaling the user terminal to indicate the identified cell as a predefined cell for subsequent use by the user terminal in recovering from a radio link failure.

In one or more embodiments, the method includes identifying a cell as a predefined cell based on determining that a given cell is a most likely handover target cell for the user terminal. That determination may be based on at least one of user terminal speed and direction of movement, user terminal position updates, history of user terminal movement, and mobility-related measurements for a currently serving cell of the user terminal. Identifying a cell as a predefined cell also may be based on determining that a given cell is a most likely handover target cell for the user terminal according to historical data regarding most frequent handover target cells from a current serving cell of the user terminal.

Further, in one or more embodiments, the base station sends the user context to a cell indicated in a signal strength measurement report by the user terminal as a best cell in terms of signal strength, even where the best cell is not the known or predicted handover target cell. Indeed, as shown in FIG. 3, and as discussed earlier herein, one or more embodiments of the base station are configured to send the user context for a given user terminal to some number of the best (strongest) cells, as identified by a measurement report from that user terminal. Additionally, or alternatively, a base station may be configured to diffuse the user context for a given user terminal to one or more neighboring base stations, at least in cases where a given user terminal is operating in a cell that is abnormal in some sense (e.g., the presence of tunnels, urban canyons, etc.).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method in a user terminal of reducing radio link failure recovery time, wherein the user terminal recovers from radio link failures by selecting a cell in a wireless communication network for reconnecting, said method comprising:
    after detecting a radio link failure, detecting cells available for use by the user terminal in reconnecting to the wireless communication network and measuring the signal strength of the detected cells;
    determining whether any of the detected cells have been predefined for use by the user terminal for recovering from radio link failure, wherein a cell is predefined if it is one known or predicted to have user context for the user terminal;
    thereafter, evaluating whether the predefined cell meets a signal strength threshold; and
    after the evaluating, attempting radio link failure recovery first through the predefined cell if the predefined cell meets the signal strength threshold.

2. The method of claim 1:
    wherein determining whether any of the detected cells is a predefined cell includes determining whether a last serving cell of the user terminal is among the detected cells; and
    wherein attempting radio link failure recovery first through the predefined cell if the predefined cell meets the signal strength threshold comprises attempting reconnection first through the last serving cell.

3. The method of claim 2, further comprising:
    attempting radio link failure recovery through the detected cell measured by the user terminal as having the strongest received signal strength, if the last serving cell does not meet the signal strength threshold.

4. The method of claim 1:
    wherein if the detected radio link failure is detected subsequent to receiving a handover command at the user terminal, determining whether any of the detected cells has been predefined for use by the user terminal for recovering from radio link failure includes determining whether a handover target cell is among the detected cells; and
    wherein attempting radio link failure recovery first through the predefined cell if the predefined cell meets the signal threshold comprises first determining whether a handover hysteresis margin and a time-to-trigger threshold are satisfied, and, if so, determining whether the handover target cell meets the signal strength threshold, and, if so, attempting reconnection first through the handover target cell.

5. The method of claim 1, wherein attempting radio link failure recovery first through the predefined cell if the predefined cell meets the signal strength threshold comprises:
    if the detected cells include more than one predefined cell, first attempting radio link failure recovery through a best one of the predefined cells, where the best one is identified in terms of received signal strength at the user terminal; and
    if the radio link failure recovery fails, next attempting radio link failure recovery in a second best one of the predefined cells.

6. The method of claim 1, wherein attempting radio link failure recovery first through the predefined cell if the predefined cell meets the signal strength threshold includes:
if radio link failure recovery fails in the predefined cell, next attempting radio link failure recovery through a best one of the detected cells, where the best one is identified in terms of received signal strength at the user terminal.

7. The method of claim 1, further comprising:
if the predefined cell does not meet the signal strength threshold, attempting radio link failure recovery through a best one of the detected cells, where the best one is identified in terms of received signal strength at the user terminal.

8. The method of claim 1:
wherein said steps of detecting, measuring, determining, evaluating, and attempting are performed after expiration of a defined failure timer that is triggered upon detecting a radio link failure; and
wherein, after a radio link failure but prior to expiration of the defined failure timer, the user terminal first attempts reconnection to a last serving cell of the user terminal.

9. The method of claim 8, further comprising adjusting the defined failure timer as a function of a user terminal speed, such that shorter expiration times are used for higher speeds and longer expiration times are used for lower speeds.

10. The method of claim 1, further comprising determining whether the received signal strength of the predefined cell meets the signal strength threshold based on:
determining whether the predefined cell is among K detected cells having strongest signal strengths at the user terminal, where K is a defined number; or
determining whether the signal strength of the predefined cell is within a defined threshold in dBs of a strongest signal strength at the user terminal among the detected cells.

11. The method of claim 1, further comprising receiving signaling from the wireless communication network indicating the signal strength threshold to be used by the user terminal in evaluating whether the predefined cell meets the signal strength threshold.

12. The method of claim 1, further comprising:
in response to handover being triggered for the user terminal, storing cell identities of those cells that are better in terms of signal strength than a handover target cell, as determined for a last measurement report by the user terminal, and determining those cells to be predefined; and
in case of handover failure, attempting radio link failure recovery through the predefined cell identified in the last measurement report as being the best in terms of Reference Signal Received Power (RSRP) or Reference Signal Received Quality (RSRQ).

13. A user terminal configured to recover from radio link failures by selecting a cell in a wireless communication network for reconnecting, said user terminal configured to:
after detecting a radio link failure, detect cells available for use by the user terminal in reconnecting to the wireless communication network and measure received signal strengths of the detected cells;
determine whether any of the detected cells have been predefined for use by the user terminal for recovering from radio link failure, wherein a predefined cell is one known or predicted to have user context for the user terminal;
thereafter, evaluate whether the predefined cell meets a signal strength threshold; and
after the evaluation, attempt radio link failure recovery first through the predefined cell, if the predefined cell meets the signal strength threshold.

14. A method in a base station of a wireless communication network of supporting recovery from radio link failure by a user terminal, said method comprising:
determining a signal strength threshold to be used by a user terminal in evaluating whether the user terminal should attempt radio link failure recovery in a cell predefined for such use, or should attempt radio link failure recovery in a cell offering a best measured received signal strength, wherein a cell is predefined if it is one known or predicted to have user context for the user terminal; and
signaling the signal strength threshold to be used, for reception by the user terminal.

15. The method of claim 14, further comprising identifying a cell in the wireless communication network as a predefined cell based on determining that a given cell is a most likely handover target cell for the user terminal, based on at least one of user terminal speed and direction of movement, user terminal position updates, history of user terminal movement, and mobility-related measurements for a currently serving cell of the user terminal.

16. The method of claim 14, further comprising identifying the predefined cell based on determining that a given cell is a most likely handover target cell for the user terminal according to historical data regarding most frequent handover target cells from a current serving cell of the user terminal.

17. A base station configured for use in a wireless communication network, said base station configured to support recovery from radio link failure by a user terminal based on being configured to:
determine a signal strength threshold to be used by a user terminal in evaluating whether the user terminal should attempt radio link failure recovery in a cell predefined for such use, or should attempt radio link failure recovery in a cell offering a best measured received signal strength, wherein a cell is predefined if it is one known or predicted to have user context for the user terminal; and
signal the signal strength threshold to be used, for reception by the user terminal.

* * * * *

UNITED STATES PATENT AND TRADEMARK OFFICE
CERTIFICATE OF CORRECTION

PATENT NO. : 8,588,057 B2  
APPLICATION NO. : 12/863203  
DATED : November 19, 2013  
INVENTOR(S) : Dimou et al.

Page 1 of 1

It is certified that error appears in the above-identified patent and that said Letters Patent is hereby corrected as shown below:

On the Title Page

Item (75), under "Inventors", in Column 1, Line 3, delete "Lindstrom," and insert -- Lindström, --, therefor.

Item (75), under "Inventors", in Column 1, Line 3, delete "Spanga" and insert -- Spånga --, therefor.

Item (75), under "Inventors", in Column 1, Line 5, delete "Sagfors," and insert -- Sågfors, --, therefor.

Item (75), under "Inventors", in Column 1, Line 5, delete "Kyrkslatt" and insert -- Kyrkslätt --, therefor.

In the Specification

In Column 14, Line 29, delete "day)." and insert -- day), --, therefor.

In Column 14, Line 30, delete "improvements Such" and insert -- improvements. Such --, therefor.

Signed and Sealed this  
Eighth Day of July, 2014

Michelle K. Lee  
*Deputy Director of the United States Patent and Trademark Office*